UNITED STATES PATENT OFFICE 2,415,705

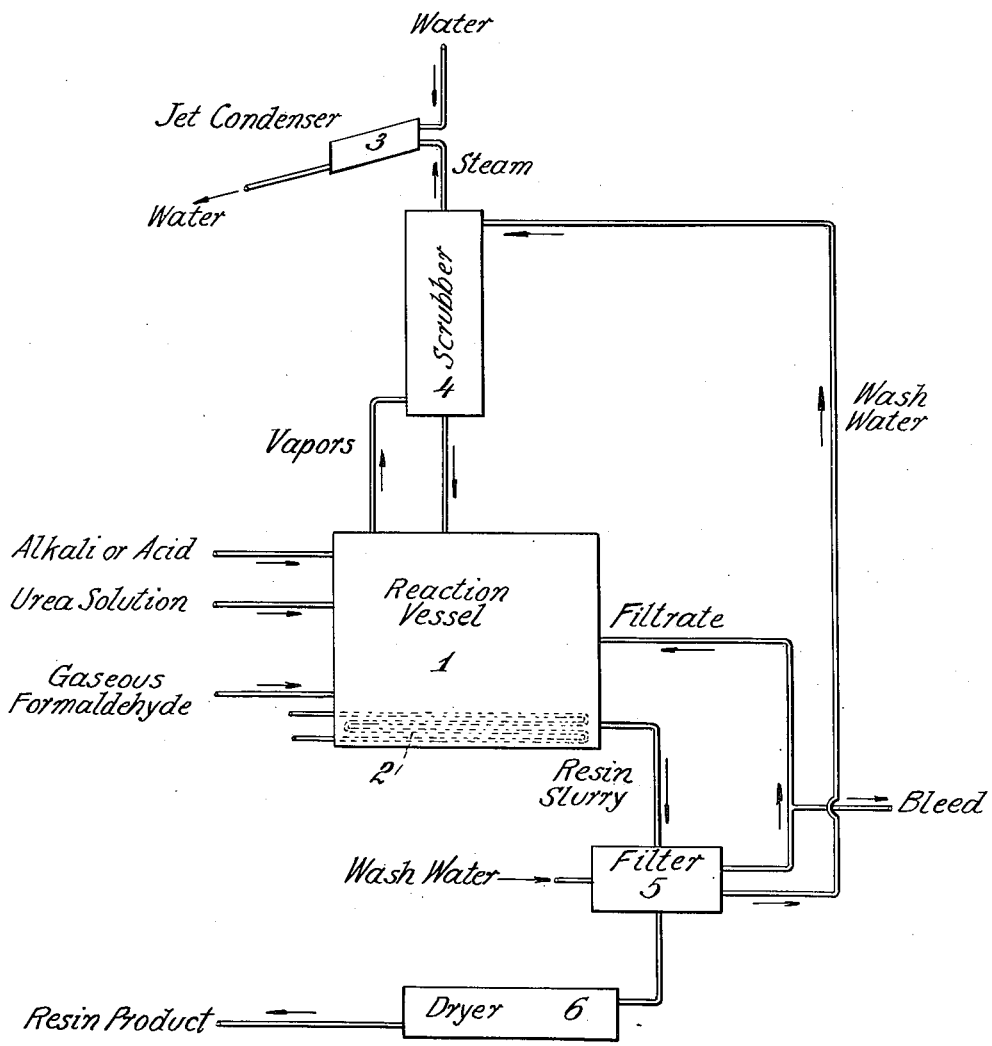

PROCESS FOR PRODUCING FERTILIZERS CONTAINING INSOLUBLE NITROGEN

Leonard V. Rohner, Syracuse, and Alvin P. Wood, Geddes, N. Y., assignors to The Solvay Process Company, New York, N. Y., a corporation of New York Application March 14, 1942, Serial No. 434,736

5 Claims. (Cl. 71—28)

This invention relates to processes for the production of a urea-formaldehyde resin containing insoluble nitrogen of high activity and available to plants. The invention further relates to the product of said process and to the fertilization of plants by addition of said product to the soil in which the plants are grown.

Numerous methods have heretofore been proposed for the production of urea-formaldehyde resins, some of which are water-insoluble. It has also been suggested to employ urea-formaldehyde resins in fertilizers. For a water-insoluble resin to be of value other than as a filler or conditioner for the fertilizer, it should meet three tests:

1. Its nitrogen content should be insoluble as determined by the method described on page 29, paragraphs 34 and 35 of "Official and Tentative Methods of Analysis," 1940 edition, of the Association of Official Agricultural Chemists (hereinafter referred to as the A. O. A. C.). The terms "insoluble nitrogen" and "insoluble resin" as used in this specification and claims refer to nitrogen or a resin containing nitrogen which is water-insoluble by these tests.

2. The insoluble nitrogen should have an activity above certain minimum limits as determined by the methods set forth on pages 29 and 30, paragraphs 36 to 39 inclusive of the 1940 edition of "Official and Tentative Methods of Analysis" of the A. O. A. C. Two tests are used for the activity of the insoluble nitrogen: (a) the neutral $KMnO_4$ test and (b) the alkaline $KMnO_4$ test. Unless a material has an activity of at least 80% by the neutral $KMnO_4$ test or an activity of at least 50% by the alkaline $KMnO_4$ test, it may be classed as inferior.

3. The insoluble nitrogen should be agronomically available. Unless the nitrogen of a urea-formaldehyde resin is usable by the plants, that resin cannot serve as a source of nitrogen for plant growth.

It is known the conditions under which urea and formaldehyde are reacted determine whether a water-soluble or a water-insoluble resin is formed. We have further found that, in producing water-insoluble resins, the conditions under which the resin is formed determine whether its nitrogen is active or inactive and agronomically available or is unavailable to plants.

We have discovered a process whereby urea and formaldehyde may be reacted in aqueous solution to precipitate from that solution a resin containing insoluble nitrogen which is at least 80% active by the neutral $KMnO_4$ test and is agronomically available. We have discovered that in order to produce the desired resin containing a substantial portion of insoluble nitrogen, which is both active and agronomically available, it is important that the resin be precipitated from a urea-formaldehyde solution under specific correlated conditions of temperature and acidity of the solution.

When formaldehyde and urea are brought together in aqueous solution under conditions suitable for the formation of an insoluble resin, there is what may be called an induction period during which no resin formation and precipitation from the solution occurs. The time for this induction period varies, depending upon the temperature and the pH of the solution; the higher the temperature and the lower the pH, the shorter the time. This induction period is followed by the formation and precipitation from the solution of water-insoluble resin. In carrying out the process of our invention the conditions maintained during the induction period do not appear important. During the precipitation of the insoluble resin, however, we have discovered that by maintaining the reaction mixture at temperatures in the range 40° to 75° C. and at acidities of pH 3 to 5, a resin containing water-insoluble nitrogen having an activity of at least 80% by the neutral $KMnO_4$ test and agronomically available is formed.

The above temperature and acidity conditions may be varied somewhat and still obtain precipitation of the desired resin. Thus, somewhat higher temperatures up to 90° C. may be maintained with the acidity of the reaction mixture maintained below pH 6 and above pH 4.

The proportions of formaldehyde and urea in the solution in which they react may be varied but in general should be within the limits of 0.75 to 1.25 mols formaldehyde for every 1 mol of urea.

The resin precipitated from a solution of urea and formaldehyde under the above conditions may be filtered or otherwise separated from the mother liquor, washed and dried to obtain a product suitable for incorporation with soil in which plants are grown. The drying of the resin from which the acidic mother liquor has been removed may be done at temperatures up to 100° C. or even higher. However, prolonged exposure of the resin to high temperatures results in a decrease in the activity of the nitrogen. It is best, therefore, to dry the non-acidic resin at temperatures below 100° C. and preferably at temperatures no higher than 75° C. Furthermore, when temperatures above 75° C. are used, it is preferred to limit the time during which the resin is exposed to the elevated temperatures to 30 minutes or less in order to minimize the decrease in active nitrogen caused by the use of high temperatures. The resin may, if desired, be recovered by evaporating the water in the mixture of resin and mother liquor. When the mother liquor is acidic during this evaporation the temperatures employed should not exceed those which are maintained during the precipitation of the resin as set forth above, since exposing the resin in the presence of acid to high temperatures results in low activity of the insoluble nitrogen.

As precipitated from the aqueous urea-formaldehyde reaction solution under the conditions described above, the resin is in the form of a finely divided solid. In drying the material it is preferred to employ a type of drying process which preserves the fine division of the resin. For example, it is preferred to dry it in a rotary drier at moderate temperatures and with sufficient agitation to prevent agglomeration. If the material is dried under conditions at which it cakes or agglomerates, it is preferred to comminute the resulting agglomerates so that all the final product will be about 100 mesh or finer. The particle size of the material appears to have some effect upon its activity as determined by the neutral $KMnO_4$ test and in the form of particles 100 mesh or smaller the resin exihibits its characteristic high activity. This particle size is not a closely limiting factor in the activity, however, and the resins of this invention, even when in the form of substantially larger particles than 100 mesh, still exhibit a high degree of activity.

The processes of this invention are further illustrated by the following examples of batch and continuous methods for the production of the resins of this invention. In these examples "parts" refers to parts by weight. For large scale operations we prefer the continuous process of Example 2 which is diagrammatically illustrated in the accompanying drawing.

*Example 1.*—About 3000 parts of solid urea are added to about 4000 parts of a 37½% solution of formaldehyde in water and dissolved in the solution. This is equivalent to about an equal mol ratio of formaldehyde and urea. There is also added about 2500 parts of water. These materials at room temperature are mixed together. As the urea dissolves, the solution is somewhat cooled by the negative heat of solution of the urea. Ammonium nitrate is then added to the solution to bring it to an acidity of 4.5 to 5. The solution is allowed to stand for some time, during which period there is a slow rise in temperature. After an induction period solid resin begins to precipitate from the solution, the temperature of the reaction mixture rises and the acidity slowly rises to a pH of about 3 as the resin precipitates. The reaction mixture is allowed to stand until completion of the resin precipitation without allowing the temperature to rise above 65° C. If the temperature tends to rise above this point, the temperature rise may be controlled by indirectly cooling the reaction mixture, by adding cold water thereto or by any other suitable means.

After completion of the formation and precipitation of the urea-formaldehyde resin the solid is filtered from the mother liquor and washed with water to remove adhering, acidic mother liquor. The washed solid is then dried by treatment with dry air at room temperature and, if necessary, comminuted until it all passes a 100 mesh screen. Resins thus produced contained 32% to 36% total nitrogen and about 29% to 35% insoluble nitrogen having an activity of at least 80% by the neutral $KMnO_4$ test.

*Example 2.*—With reference to the drawing, the numeral 1 designates a reaction vessel provided with a heater 2. The vessel is so designed that it may be maintained under a reduced pressure by means of a jet condenser 3 drawing vapors from vessel 1 through a scrubber 4. A solution of urea in water containing about 77% urea by weight is continuously passed into reaction vessel 1. Simultaneously gaseous formaldehyde in about an equal mol ratio to the urea, is introduced into vessel 1 and intimately contacted with the urea solution so that the formaldehyde is dissolved in that solution. An alkali, such as sodium hydroxide or ammonia, or an acid, such as phosphoric or nitric acid, is also introduced into vessel 1 as required to maintain the reaction mixture therein at a pH of about 3.5, depending on pH characteristics of the ingredients. The main reaction tends to be accompanied by a slight liberation of acid, normally requiring small amounts of alkali for maintenance of the desired pH.

Under these conditions, with the reaction mixture in vessel 1 maintained at 70° C., the urea and formaldehyde react to form an insoluble resin which precipitates from the solution. By means of jet condenser 3 the reaction mixture is maintained under a pressure at which it boils at 70° C. due to the heat of reaction and any desired additional heat which may be supplied by heater 2. Slurry of mother liquor containing precipitated resin is continuously withdrawn from reaction vessel 1 and passed to a filter 5 in which the resin is separated from the mother liquor and washed with water. The washed resin is then dried in a rotary drier 6 by contact with heated air under conditions such that product temperature preferably does not exceed about 75° C. The dried resin, after being classified and any large agglomerates being comminuted so that it all passes a 100 mesh screen, is withdrawn as the product of the process. The mother liquor filtrate and wash water from filter 5 are returned to vessel 1. Some of the mother liquor is bled from the system as required to prevent undue accumulation of incidental soluble compounds in the liquors circulated therein. A sufficient amount of the liquid returned to vessel 1, preferably the wash water, is passed through scrubber 4 in contact with the vapors drawn from vessel 1, to scrub from those vapors any spray carried over from vessel 1 or formaldehyde unabsorbed by the reaction mixture in that vessel. In place of wash water, some of the water leaving condenser 3 may be returned to scrubber 4 for this purpose.

By supplying a suitable quantity of heat to the reaction mixture by means of heater 2 in addition to the heat evolved by the reaction itself, the water introduced in the urea solution and as wash water used in filter 5 and the water liberated by reaction of the urea and formaldehyde may all be vaporized and taken off through jet condenser 3.

In continuous operation of the procedure of this example there is always maintained in vessel 1 a body or pool of a slurry of resin and mother liquor boiling at a temperature of about 70° C. having a pH of about 3.5. The urea and formaldehyde continuously introduced into this reaction mixture react to form and deposit the desired resin which is continuously withdrawn in the slurry passed from vessel 1 to filter 5. Reaction vessel 1 may contain baffles arranged so that the materials flow along a defined course through the vessel from the point at which the urea and formaldehyde are introduced to the point at which the slurry is withdrawn and the time required for this passage is sufficient for practically complete reaction of the urea and formaldehyde and precipitation of the desired resin. The vessel may also contain means for stirring the reaction mixture to maintain it as a substantially uniform slurry.

Numerous changes and modifications may be made in the particular examples described above without departing from the scope of our invention. One such modification of particular importance enables one to produce a mixture of the resin and an ammonium salt such as ammonium nitrate. The batch process of Example 1 may be modified in the following manner in order to produce such a product:

The solution containing urea and formaldehyde is acidified to a pH of 4.5 to 5 by addition of an acid or an ammonium salt, e. g. ammonium nitrate. During the initial induction period the formaldehyde reacts with the urea. After the formaldehyde has undergone this preliminary reaction, which precedes formation of the insoluble resin, any desired quantity of ammonium nitrate or other ammonium salt is dissolved in the solution. For example, the total amount of ammonium nitrate added to the reaction mixture may be equal to the weight of the urea incorporated therein. After precipitation of the urea-formaldehyde resin the resulting slurry of solid and mother liquor is then evaporated to dryness at temperatures preferably not higher than 75° C. The mixture of solid ammonium nitrate and resin thus obtained may be broken up to desired sized particles. The fertilizer thus made contains both water-soluble nitrogen and insoluble nitrogen, the latter having a high activity by the neutral $KMnO_4$ test and being agronomically available.

In this modification of the process of Example 1, by adding to the reaction mixture the desired large quantities of ammonium nitrate or other ammonium salt such as ammonium sulfate or an ammonium phosphate, only after the formaldehyde has reacted with the urea, the acidity of the reaction mixture is maintained at the desired pH 3 to 5 during the precipitation of the urea-formaldehyde resin. If too much ammonium salt is initially added before the formaldehyde has reacted with the urea, a reaction occurs between the salt and formaldehyde forming hexamethylene tetramine and liberating free acid in amount sufficient to render the reaction mixture from which the resin is precipitated unduly acid.

Resins prepared by the process of this invention containing 29.5% to 35% water-insoluble nitrogen have shown activities of the insoluble nitrogen by the neutral $KMnO_4$ test of 89% to 96%. By contrast, resin containing 36.4% water-insoluble nitrogen prepared under comparable conditions except that the reaction mixture was at a pH of 2.5 or lower and had a temperature of 100° C. during precipitation of the resin, showed an activity by the neutral $KMnO_4$ test of 19.

Crop growing tests have shown the agronomic availability during a growing season of the insoluble nitrogen in the resins prepared by the process of this invention. The following table shows the results obtained in growing various crops in different types of soil using as fertilizers resins A of the table made by the process of our invention as compared with (1) resins B precipitated from solution at a pH of 3 or lower at 90 to 100° C.; (2) a control test in which the crop was not supplied with a nitrogenous fertilizer, and (3) using a mixture of equal parts ammonium sulfate and sodium nitrate to supply nitrogen. In all cases comparable quantities of potash and superphosphate were supplied to the soil in which the plants were grown. Series 1 represents crops grown in an unlimed heavy silt loam; series 2 crops grown in a limed heavy silt loam; series 3 crops grown in an unlimed light sandy loam; and series 4 crops grown in a limed light sandy loam. The dry weight of the plant growth is given for all crops. In the case of tomatoes and cabbage, the four series were run with the total nitrogen taken up by and present in the harvested plants determined. This nitrogen content is of different crops from those for which the dry weight was determined, but the crops for which the nitrogen taken up is shown in the table were grown in the types of soil described above for each series of the table.

|  | Tomato | | Cabbage | | Barley, dry weight | Corn, dry weight |
| --- | --- | --- | --- | --- | --- | --- |
|  | Dry weight | Nitrogen taken up | Dry weight | Nitrogen taken up | | |
| Series 1 | | | | | | |
| Resin A | 24 | 431 | 25 | 660 | 5. | 8 |
| Resin B | 5 | 46 | 16.5 | 363 | 2.5 | 5.5 |
| Control | 20 | 203 | 19 | 317 | 2 | 1 |
| N-salts | 26 | 347 | 32 | 977 | 7 | 6 |
| Series 2 | | | | | | |
| Resin A | 28.5 | 408 | 29 | 924 | 11 | 10.5 |
| Resin B | 20.5 | 119 | 16 | 210 | 8.5 | 3 |
| Control | 20 | 152 | 24.5 | 447 | 5 | 5 |
| N-salts | 54.5 | 749 | 28 | 786 | 11 | 8.5 |
| Series 3 | | | | | | |
| Resin A | 32 | 753 | 33 | 1,035 | 9 | 30 |
| Resin B | 36 | 119 | 13 | 147 | 5 | 5 |
| Control | 33 | 104 | 16.5 | 168 | 6 | 7 |
| N-salts | 58.5 | 405 | 31.5 | 1,193 | 11 | 16 |
| Series 4 | | | | | | |
| Resin A | 63 | 943 | 31 | 862 | 7.5 | 18.5 |
| Resin B | 44.5 | 231 | 16 | 260 | 5.5 | 6 |
| Control | 24 | 209 | 9 | 133 | 4 | 3.5 |
| N-salts | 35.5 | 688 | 26 | 759 | 7 | 8 |
| Average | | | | | | |
| Resin A | 37 | 634 | 29.5 | 870 | 8 | 17 |
| Resin B | 26.5 | 129 | 15 | 245 | 5.5 | 5 |
| Control | 24 | 167 | 17.5 | 266 | 4 | 4 |
| N-salts | 43.5 | 547 | 29 | 929 | 9 | 9.5 |

From the data of the above table it is apparent that in every case the nitrogen of resin A made in accordance with the process of our invention was available to the plants during their growing season. Resin B, on the other hand, frequently showed poorer results than the control in which no nitrogen was supplied. Its nitrogen was shown to be unavailable over a normal growing season. In no case did the nitrogen taken up by the plants grown with resin B approach the value of that taken up by plants grown with resin A. The averages for dry weight and nitrogen taken up by the several crops show that resin B was little, if any, better than no nitrogenous fertilizer. The growth of crops fertilized with resin A was slow during the first month, evidencing the desirable slow decomposition of the resin in the soil to yield up its nitrogen content. However, the nitrogen of the resin became available to the growing plants and over the growing season its effect in promoting crop growth was about equal to that of the nitrogen in the mixture of the commonly used nitrogenous fertilizer salts, ammonium sulfate and sodium nitrate.

The process disclosed herein for reacting formaldehyde and urea in an acidic aqueous solution to form an insoluble resin and adding an ammonium salt to the solution after substantially all the formaldehyde has combined with the urea and evaporating the water from the solution to recover a solid containing the resin and ammonium salt, is claimed in our copending application Serial No. 541,296, filed June 20, 1944, as a continuation-in-part of the present application.

We claim:

1. The process for the production of a fertilizer containing active and available insoluble nitrogen which comprises boiling a pool of aqueous slurry of urea-formaldehyde resin under reduced pressure at a temperature in the range 40° C. to 75° C., maintaining said slurry acidic and at a pH of 3 to 5, continuously introducing into the boiling slurry formaldehyde and urea in the proportions of 0.75 to 1.25 mols formaldehyde for every 1 mol of urea, whereby said urea and formaldehyde react in said aqueous slurry to form an insoluble resin which is precipitated, continuously removing precipitated resin from said pool, washing the resin until it is substantially freed of acid and then drying the resin while heating it to temperatures low enough to prevent the activity of the insoluble nitrogen of the resin by the neutral $KMnO_4$ test being reduced to below 80%.

2. The process for the production of a fertilizer containing active and available insoluble nitrogen which comprises boiling a pool of aqueous slurry of urea-formaldehyde resin under reduced pressure at a temperature in the range 40° C. to 75° C., maintaining said slurry acidic and at a pH of 3 to 5, continuously introducing into the boiling slurry formaldehyde and urea in the proportions of 0.75 to 1.25 mols formaldehyde for every 1 mol of urea, whereby said urea and formaldehyde react in said aqueous slurry to form an insoluble resin which is precipitated, continuously withdrawing slurry of resin from said pool, separating mother liquor from the solid resin, returning the mother liquor to said pool, washing the resin with water until it is substantially freed of acid and then drying the resin while heating it to temperatures low enough to prevent the activity of the insoluble nitrogen of the resin by the neutral $KMnO_4$ test being reduced below 80%.

3. The process for fertilizing soil with insoluble nitrogen which is active and available to growing plants, which comprises incorporating in the soil in which said plants are grown a urea-formaldehyde resin having an activity of at least 80% by the neutral $KMnO_4$ test which resin has been formed by reaction of 0.75 to 1.25 mols formaldehyde and 1 mol urea in an aqueous solution which during precipitation therefrom of said resin is maintained at a pH of 3 to 5 and at temperatures within the range 40° to 75° C., and the thus precipitated resin is dried at temperatures low enough to prevent the activity of the insoluble nitrogen of the resin by the neutral $KMnO_4$ test being reduced below 80%.

4. The process for fertilizing soil with insoluble nitrogen which is active and available to growing plants, which comprises incorporating in the soil in which said plants are grown a urea-formaldehyde resin having an activity of at least 80% by the neutral $KMnO_4$ test and a particle size such that substantially all passes a 100 mesh screen, said resin having been formed by reaction of formaldehyde and urea in the ratio of 0.75 to 1.25 mols formaldehyde to 1 mol urea in an acidic aqueous solution at temperatures of 40° to 75° C. to form a mixture of mother liquor and resin precipitated from said solution while maintaining the solution during the precipitation of said resin at a pH of 3 to 5, and the thus precipitated resin having been separated from the mother liquor and dried while maintaining it at temperatures below 75° C.

5. The process for fertilizing soil with insoluble nitrogen which is active and available to growing plants which comprises incorporating in said soil a finely divided urea-formaldehyde resin having an activity of at least 80% by the neutral $KMnO_4$ test, said resin having been formed by reaction of formaldehyde and urea in the ratio of 0.75 to 1.25 mols formaldehyde to 1 mol urea and precipitation of the resin in an acidic aqueous solution maintained at temperatures in the range 40° to 90° C. and at acidities so correlated with the temperatures of the solution in said range that the acidity of solution at temperatures of 40° to 75° C. is maintained at a pH of 3 to 5 and the acidity of solution at temperatures of 75° to 90° C. is maintained at a pH below 6 and above 4, and the thus precipitated resin is dried at temperatures low enough to prevent the activity of the insoluble nitrogen of the resin by the neutral $KMnO_4$ test being reduced below 80%.

LEONARD V. ROHNER.
ALVIN P. WOOD.

REFERENCES CITED

The following references are of record in the file of this patent:

UNITED STATES PATENTS

| Number | Name | Date |
|---|---|---|
| 2,255,026 | Keenan | Sept. 2, 1941 |
| 2,255,027 | Keenan | Sept. 2, 1941 |
| 2,096,742 | Hale | Oct. 26, 1937 |
| 1,790,461 | Cherry | Jan. 27, 1931 |
| 2,056,455 | Howald | Oct. 6, 1936 |
| 1,967,261 | Ripper | July 24, 1934 |
| 2,140,561 | Smidth | Dec. 20, 1938 |

FOREIGN PATENTS

| Number | Country | Date |
|---|---|---|
| 431,585 | Germany | July 12, 1926 |

OTHER REFERENCES

"Chemical Soc. Transactions," Dixon, 1918, vol. 113, pages 238–248.

"J. Soc. Chem. Ind.," Japan 43, No. 11, pages 366 B–369 B (Nov. 1940).

"Chemistry of Synthetic Resins," Ellis, vol. 1, pages 594–596 (1935).